United States Patent [19]
Larsen et al.

[11] Patent Number: 5,303,308
[45] Date of Patent: Apr. 12, 1994

[54] AUDIO FREQUENCY SIGNAL COMPRESSING SYSTEM

[75] Inventors: Leo Larsen, Kokkedal; Jens Madsen, Ballerup, both of Denmark

[73] Assignee: GN Netcom A/S, Copenhagen NV, Denmark

[21] Appl. No.: 909,896

[22] Filed: Jul. 7, 1992

[51] Int. Cl.$^5$ .................. H03G 7/00; H03G 3/00; A61F 11/06; H04B 1/64
[52] U.S. Cl. .................. 381/106; 381/72; 381/108; 333/14
[58] Field of Search .............. 381/106, 104, 107, 108, 381/72, 55; 333/14; 379/395

[56] References Cited
U.S. PATENT DOCUMENTS

| | | | |
|---|---|---|---|
| 4,466,119 | 8/1984 | Peters et al. | 381/106 |
| 4,893,344 | 1/1990 | Tragardh et al. | |
| 4,928,307 | 5/1990 | Lynn. | |
| 5,058,155 | 10/1991 | Larsen. | |

FOREIGN PATENT DOCUMENTS 2152786 8/1985 United Kingdom ............... 381/106

Primary Examiner—Curtis Kuntz
Assistant Examiner—Ping Lee
Attorney, Agent, or Firm—Merchant, Gould, Smith, Edell, Welter & Schmidt

[57] ABSTRACT

An audio frequency compressing system for amplifying an input signal to produce a power output signal while removing high-level signals which could harm a listener. Gain control in the feedback path of an amplifier includes both a gain controller circuit for supplying a constant feedback impedance and a plurality of resistors which can be coupled to the gain controller circuit to increase or decrease the feedback impedance. Coupling of the resistors to the gain controller circuit is controlled by a feedback control circuit having both an automatic gain control circuit and a continuous high-level protection circuit.

16 Claims, 2 Drawing Sheets

AUDIO FREQUENCY SIGNAL COMPRESSING SYSTEM

BACKGROUND OF THE INVENTION

The invention relates to communication equipment for audio frequency signals, and especially equipment providing protection against high-level noise signals and other unwanted high-level signals.

The system according to the invention is developed particularly for use in connection with the applicant's U.S. Pat. No. 5,058,155, concerning a multipurpose headset amplifier; consequently, all which appears from the said USA patent by this reference is included in the present application.

The audio frequency signal compressing system according to the present application can be applied as an independent circuit for the protection of a headset user against unwanted high-level signals. However, the system also allows for integration and can form part of the multipurpose headset amplifier according to the above mentioned USA patent; it then replaces blocks 33 and 34 in FIG. 2 of the drawing.

Nowadays telephone systems are very extensively used, and not only for ordinary telephone communication, but also for communication by means of electronic equipment such as computer modems, telefax machines, automatic data transmission equipment, etc. As a result of this increased use of the telephone network, wanted signals as well as unwanted signals such as transients, impulses, continuous high-level sounds, etc., appear on the network lines.

When using an ordinary telephone apparatus provided with a handset to be held in the user's hand, the telephone receiver can quickly be removed from the user's ear if an unpleasant signal level appears, If, however, a headset is used, e.g. as known from the applicant's U.S. Pat. No. 4,893,344, or any corresponding headset to be mounted on the user's head, the user will not be able to quickly remove the receiver from his/her ear(s) and will thus involuntarily be affected by the high level signals. The extensive use of telephone headsets has aggravated this problem.

To properly protect against continuous noise, the U.S. Occupational Safety and Health Administration (OSHA) has established a 85 dBA(t) limit for 8 hours time weighted averaged measured signal on an A scale. The designation "dBA(t)" is 20 times the log of a sound level with respect to 20 micropascals, which is "A" weighted and time averaged.

To protect against high-level sound signals, AGC (Automatic Gain Control) circuitry in receiver amplifiers is normally adjusted so that the earphone speaker output will not exceed 94 dBSPL. The term "dBSPL" refers to "sound pressure level", which is the same as "dBA(t)" except that the "A" weighting curve is removed along with the time averaging. Limiting sound to a dBSPL rating is easily accomplished by the use of ACC circuitry with peak detecting control.

Within the difference between the "dBA(t)" and "dBSPL" sound ratings, there lies a problem. The "dBA(t)" limit allows for the acoustic peaks and valleys that normally occur in speech by virtue of its time averaging feature, However, the peak detection methods required by the "dBSPL" circuits do not. The crest factor of a continuous sine wave is 1.414, whereas the crest factor of normal speech may exceed 5 (the "crest factor" can simply be described as the ratio of a waveform's "peak" value to the "rms" value).

Because of the crest factor, AGC circuitry will limit human voice signals to a level far below 94 dBA(t). User safety with respect to peaks and continuous sound is preserved with this limit, but the level of human voice output signal from the earphone speaker in normal environments is difficult to understand. This has its own deleterious effect by adding user stress because of the strain required to hear the signal and by decreasing productivity due to the repeated questions and statements regarded during conversations.

The optimum solution is to limit voice and continuous signals equally to 85 dBA(t). However, the crest factor of the two signal types does not allow an easily integratable peak detecting limiter circuit to be utilized.

Prior art technique known from U.S. Pat. No. 4,928,307 for protection against continuous high-level signals includes a voice signal compression system wherein the compression threshold may be adjusted to a calibrated level. The system includes a variable gain amplifier for amplifying a voice input signal based on the application of a variable control voltage. A driver increases the power gain of the amplified input signal to provide a power-boosted output signal. In addition to applying the power-boosted output signal to an acoustic output transducer, the power-boosted output is also applied both to a peak detecting comparator and to a threshold reset timer. The comparator produces a digital output that triggers an attack/decay timing generator which produces the control voltage for the variable gain amplifier. The comparator initially is sat to a high threshold state by the threshold reset timer. An the levels and peaks of the input signal increase, the comparator begins to trigger digital pulses to the attack/decay timer. At the same time, the threshold roast timer begins measuring the duration of the signal which exceeds the threshold of the comparator. If the threshold reset timer detects that the level of the power-boosted output signal exceeds the threshold of the comparator for a preselected time, then the compression threshold of the comparator is switched to a lower level. The threshold remains low until the continuous signal is removed. At this point, the circuit in reset to its normal mode of operation.

SUMMARY OF THE INVENTION

The present invention provides an audio frequency signal compressing system, wherein the compression threshold may be adjusted to a level following the OSHA procedure, without introducing other perceptible signals in connection with adjustment and limitation of the output signal level. The system includes amplifier means for amplifying an input signal to provide a power output signal wherein amplifier gain of the amplifier means varies according to a control voltage applied to the amplifier means from gain controller means; first means connected to the gain controller means for comparing the power output signal and a first threshold level signal to provide a first comparator output signal corresponding to the difference between the power output signal and the first threshold level signal; second means connected to the gain controller means for comparing a filtered version of the power output signal to a second and third threshold level signal to provide second comparator output signals to the gain controller means corresponding to the relationship between the filtered version at the power output signal and the second and third threshold level signals.

In the preferred embodiment, the system also includes a headset with a hard-clipping circuit for hard-clipping transient signals.

According to another aspect of the present invention, an audio frequency compressing system is described which amplifies an input signal to produce a power output signal while removing high-level signals which could harm a listener. Gain control in the feedback path of an amplifier includes both a gain controller circuit and a plurality of resistors which can be coupled to the gain controller circuit to increase or decrease amplifier gain. Coupling of the resistors is controlled by a feedback control circuit having both automatic gain control means for selectively coupling one of the plurality of resistors to the gain controller circuit when the power output signal exceeds a predetermined reference level and continuous high-level protection means for selectively coupling one of the plurality of resistors to the gain controller circuit as a function of an average of the power output signal.

According to yet another aspect of the present invention, an amplifier is described in which gain control in the feedback path provides for a plurality of discrete levels of gain. The level of gain selected is a function of both a comparison of the amplifier output to a predetermined reference level and a comparison of an average of a filtered version of the amplifier output to a second predetermined reference level. In one embodiment, the discrete levels of gain are controlled by coupling one or more resistors from a plurality of resistors to a gain controller circuit.

The audio frequency signal compressing system thus allows a headset user to use a headset receiver continuously, without risking that unwanted signals exceeding a pre-selected level reaches the headset receiver. Even though the circuit's output signal level is adjusted currently, the adjustment is carried out in such a manner that the level will never exceed a pre-selected maximum level. The adjustment according to the invention is moreover carried out in such a manner that there is a minimum number of sudden gain shifts, because the gain to a very great extent is attenuated or increased continuously, and in such a manner that no perceptible signals are admitted to the wanted acoustic signal.

In order to further protect the user, the compressing system will normally comprise a hard-clipping circuit positioned in the headset or into the headset-cable—between the cable plug and the headset, which will prevent the user from using the headset without the hard-clipping circuit being activated.

The further scope of applicability of the present invention will become apparent from the detailed description given hereinafter. However, is should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENT

Figure 1:
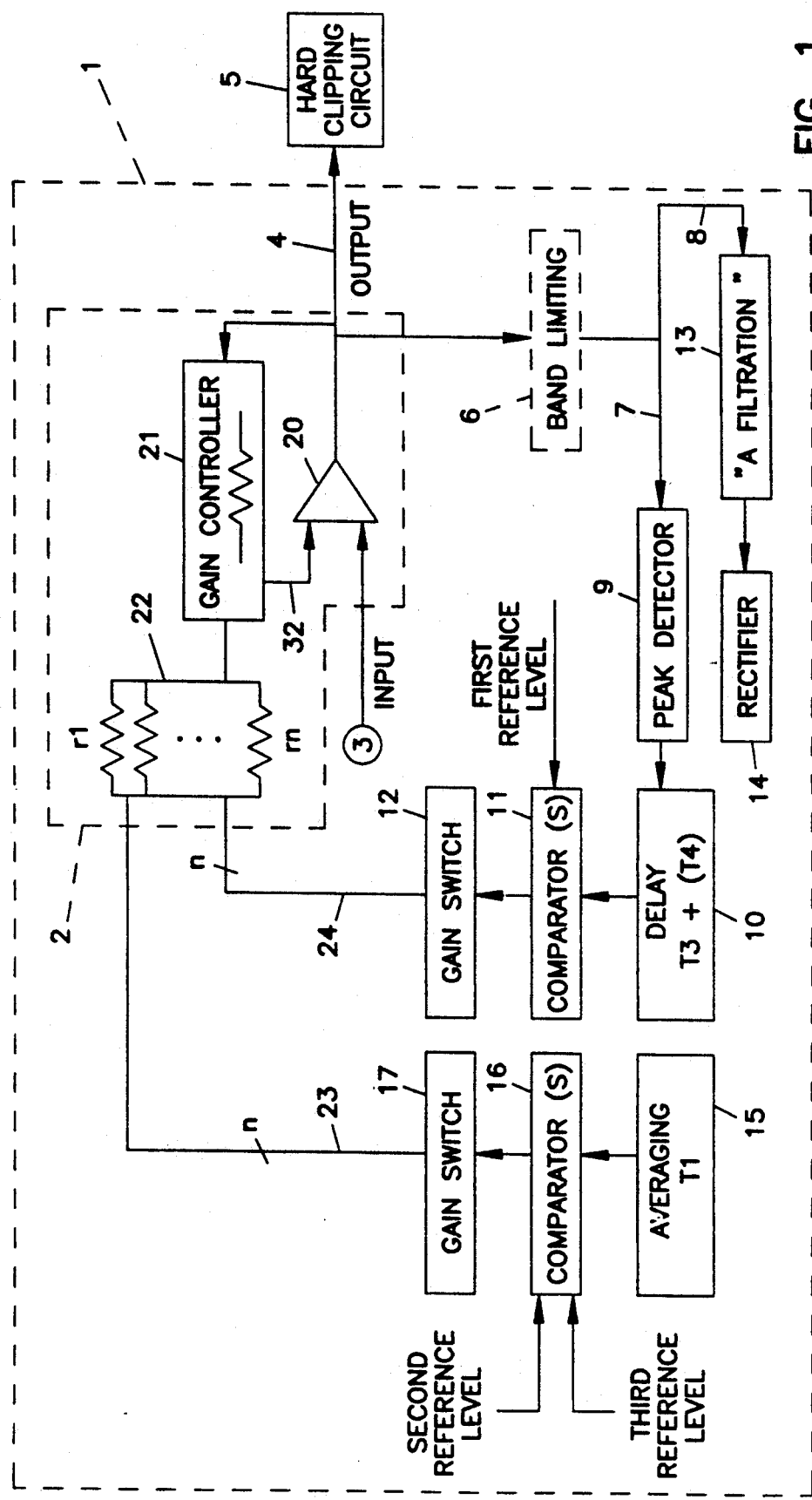
FIG. 1 is a block-diagram showing the protection circuit in full and a headset.

The broken frame 1 in FIG. 1 is a protection circuit according to the invention. The circuit 1 can be designed as an integrated circuit, either as an independent circuit as shown in FIG. 1, or it can be fully integrated in the amplifier circuit according to the applicant's U.S. Pat. No. 5,058,155, preferably instead of the blocks 33 and 34 as shown in FIG. 2 in the present application. The circuit 1 comprises a gain controller circuit 2 having an inverting power amplifier 20 with a gain control block 21 in the power amplifier's 20 feedback branch. The gain controller 21 is controlled by two signal processing circuits; a circuit comprising the blocks 13, 14, 15, 16 and 17, which protects the user against continuous high-level signals, and a circuit comprising the blocks 9, 10, 11 and 12, which makes up the circuit's AGC circuit. The two circuits are coupled in parallel and thus function independently of each other. The gain controller generates a control voltage 32 for the amplifier 20.

The circuit 1 in FIG. 1 is an ordinary block-diagram and shows only the signal processing. However, it will be obvious to a person skilled in the art that the individual circuit parts require power which is supplied in a commonly known manner and is not shown in the diagram.

The audio signal, e.g. a signal from a telephone line, is coupled to the circuit at the inlet 3 of the amplifier 20, and after suitable amplification the output signal is led via an output conductor 4 to a telephone receiver, e.g. a headset 5. In the headset 5 is inserted a hard-slipping circuit, which cuts off all signals exceeding a previously determined level, e.g. all signals exceeding 140 dB peak sound pressure level, of. OSHA. The hard-clipping circuit can be a commonly known hard-clipping circuit comprising two diodes coupled in anti-parallel, but will in future headsets mostly consist of two transistors coupled in antiparallel.

The two previously mentioned signal processing circuits will hereafter be explained in more detail and with reference to the drawing. Before the feedback signal from the power amplifier 20 is led to the signal processing circuits, the signal is frequency limited in a band-pass filter 6, which by way of example has a band-pass area ranging from 200 Hz to 4 kHz, if the signals are ordinary telephone signals. Since the feedback signal is taken from the output signal of the amplifier 20 and not directly from the sound pressure of the transducer in the headset 5, the feedback signal has to be adjusted. Normally a high-quality transducer with a constant transfer function is applied, and the adjustment is thus effected by means of a frequency band limiting circuit 6.

The signal is hereafter led to an "A" filter 13, whose filter function is arranged in such a manner that the final acoustic signal from the receiver in the headset 5 to the user is correctly it "A" filtered, of. e.g. the OSHA rules. The equivalent sound pressure level is weighted in this filter. Low frequencies give a low weight, and frequencies in the middle range give the highest weight.

The output signal from the filter circuit 13 is led to a rectifier circuit 14, which can be a half-wave or a full-wave rectifier, in order for an averaging to be provided in the next circuit block 15. In order to follow the OSMA procedure we must have an average of the signal, otherwise it will give a bad performance to change the gain too often because of an impulse or a transient. Impulses or transients are decreased by the hard-clipping circuit and will never damage the hearing. In human speech there are many utterances separated by periods of near silence. The time lengths of the utterances differ from language to language and from person to person, and so do the pauses. Too many gain shifts will give a bed speech intelligibility or performance. The average time of the averaging circuit 15 in programmed to 3 sec. (T1), but can easily be changed in order to obtain the beet performance. OSHA describes an averaging time in the range 500 mS to 8 sec.

The signals are now averaged over the programed period of time, and a comparator block 16 will now make a decision whether the gain is correct or whether it must be increased or decreased. A comparator compares the current signal to a sat reference level, e.g. 85 dBA(t), and if the signal level is found too high, it gives information to the gain switch to decrease the gain. Another comparator compares the current signal to a second set reference level, and if it is found too low, it gives information to the gain switch 17 to increase the gain. If the signal level lies between the high and the low reference level, there will be no changes in the gain.

The gain switch system 17 consists of a few transistors. The transistors change the feedback in the variable gain controller 20 coupling one of the resistors rl-rn via lines 23 to the gain controller's 21 control circuit 22. In this way the gain is either increased or decreased.

After band-pass filtering in the band-pace filter 6, the output signal 4 in also led to the ordinary AGC circuit via the conductor 7. First the signal passes a peak detector 9. The peak detector detects the peak of the present signal and holds it for a specified time. The signal is hereafter led on to the following delay circuit 10. We do not want the circuit to change the gain if the signal is a short impulse and therefore a delay T3 (attack time delay) is added. When the high-level signals change to a more normal level, a further delay T4 (decay time delay) is added. After the delay it is obvious whether the signal is an impulse or a continuous high-level signal, and a decision can be made to change the gain, The peak signal is compared in comparator(a) 11 to a specified reference voltage (Bound pressure level), and if it in too high, an on-signal in sent to the following gain switch 12. If the present peak of the signal changes to a lower level, an off-signal is sent to the gain switch after the further delay T4. The gain switch 12 receives on and off signals from the comparator circuit. If the signal is an on-signal, the feedback in the variable gain controller 21, 22 is changed to decrease the gain, and if the gain switch receives an offsignal, the gain will be increased again. The gain switch 12 in vie a number of lines 24 coupled to a number of adjustment resistors (rl . . . rn) in the block 22 in the same way as explained in connection with the circuit which protects against continuous high-level signals.

Figure 2A:
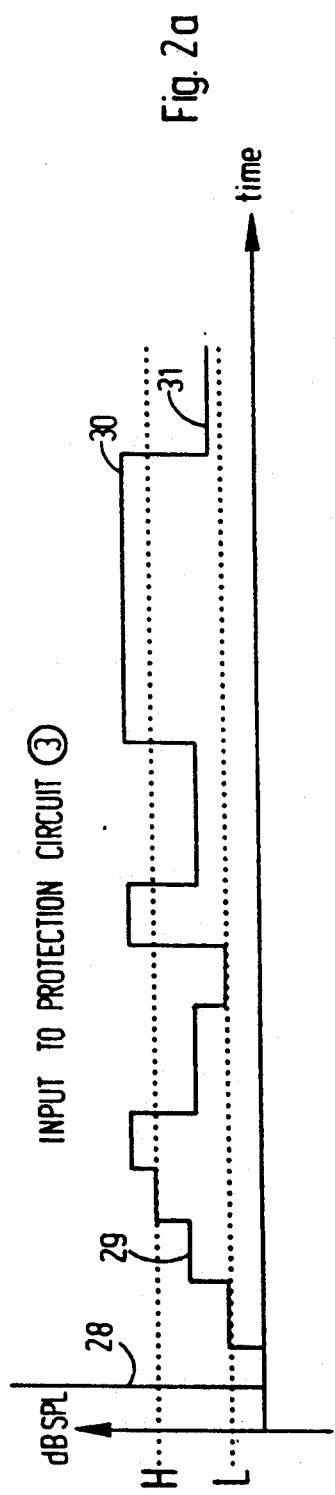
FIGS. 2a-2c are timing diagrams illustrating the compressing circuit in accordance with the present invention.
Figure 2B:
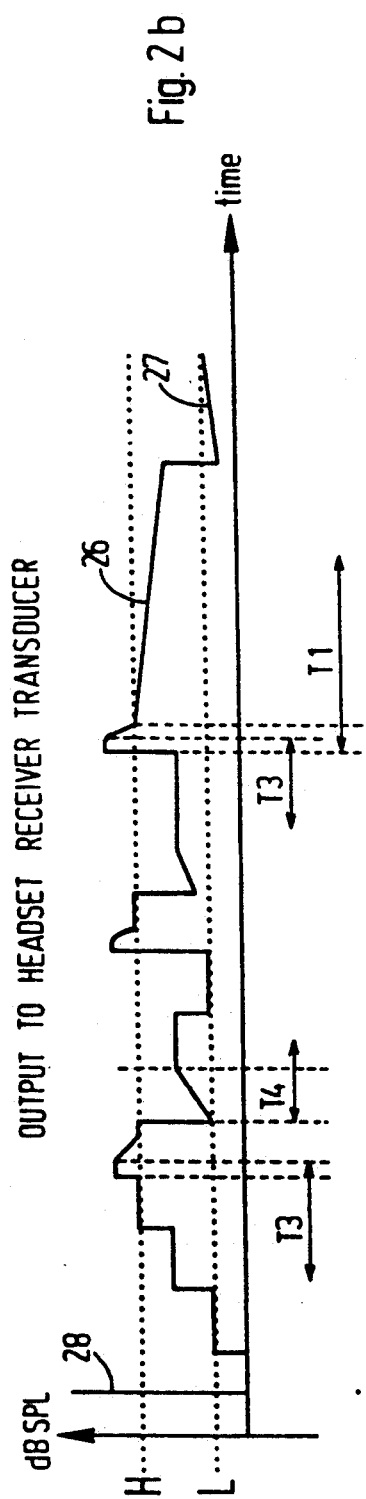
Figure 2C:
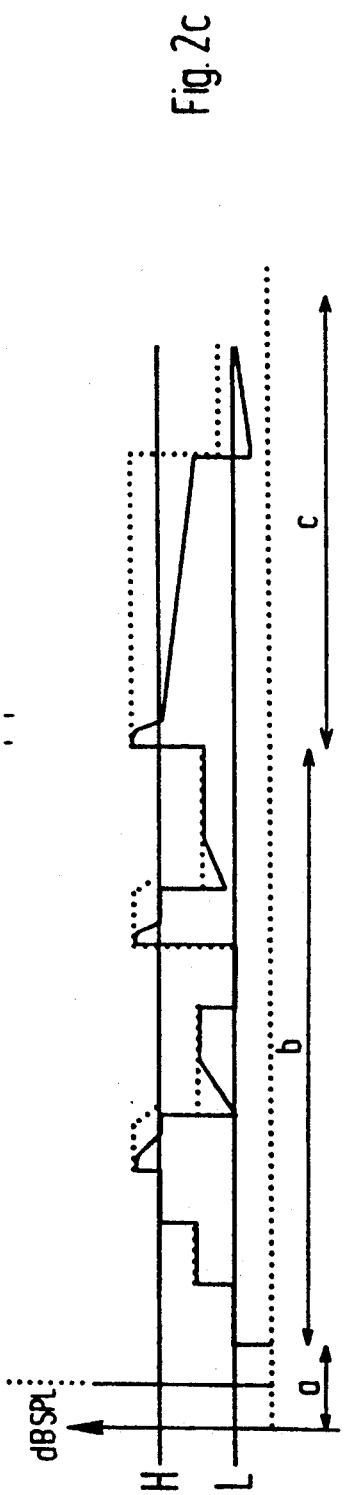

FIG. 2 shows timing diagrams, where FIG. 2a shows input signals to the protection circuit, and where FIG. 2b shows the output signal to the headset receiver transducer, and where FIG. 2c shows the combined signal.

The timing diagrams show three situations, a, b, and c.

a shows a transient 28 being limited by the hard-clipping circuit.

b shows how the normal AGC is functioning. After the delay T3 the gain is decreased to the high-level threshold H. Later on the input is lowered to the low threshold level L and after the delay T4 the gain is increased back to normal level.

c shows how tho protection circuit protects against continuous high-level signals 30. The noise level becomes higher than the high-level threshold H, which could for example be sat at 85 dBA(t), and the sound pressure level 26 is attenuated. Later on the input 31 is lowered and the circuit starts increasing the gain again 27, until the level is between the low threshold level L and the high threshold level H.

What is claimed is:

1. An audio frequency signal compressing system comprising:
   a) amplifier means for amplifying an input signal to provide a power output signal, wherein amplifier gain of the amplifier means varies according to a control voltage applied to the amplifier means;
   b) gain controller means connected to the amplifier means, for modifying the control voltage;
   c) feedback means, connected to the amplifier means, for deriving a feedback signal having a feedback signal amplitude from the power output signal;
   d) first means, connected to the gain controller means and the feedback means, for reducing the amplifier gain, wherein the first means comprise a peak detector and a first comparator means, wherein the peak detector is connected to the feedback signal in order to detect peaks of the feedback signal and wherein the first comparator means is connected between the gain controller means and the peak detector in order to select a first reduced gain when the detected peak is above a first reference level;
   e) second means, connected to the gain controller means and the feedback means, for varying the amplifier gain, wherein the second means comprise signal filer means for filtering the feedback signal and second comparator means, connected to the signal filter means and the gain controller means, for averaging the filtered feedback signal and for comparing the averaged filtered feedback signal to second and third reference levels to determine adjustments to the amplifier gain.

2. An audio frequency signal compressing system according to claim 1, wherein the feedback means comprise a common band limiting circuit for frequency limiting the power output signal to form the feedback signal.

3. An audio frequency signal compressing system according to claim 1, wherein the first means further comprise a circuit for generating an attack time delay and a decay time delay for the comparator.

4. An audio frequency signal compressing system according to claim 1, wherein the second comparator means comprise programming means for selecting a time period over which the filtered feedback signal is averaged.

5. An audio frequency signal compressing system according to claim 1, wherein the first and second means further comprise first and second gain switches, respectively, wherein the first gain switch is connected to the first comparator means of the first means and the second gain switch is connected to the second comparator means of the second means and wherein the gain controller means comprise a gain controller circuit, a plurality of resistors (r1 ... rn) and means, connected to the first and second gain switches and to the plurality of resistors, for adjusting amplifier gain by electrically connecting, under control of the first and second gain switches, a resistor from the plurality of resistors to the gain controller circuit.

6. An audio frequency signal compressing system according to claim 1, wherein the system further comprises a headset connected to the power output signal and wherein the headset comprises a hard-clipping circuit positioned to clip the power output signal amplitude when it rises above a predetermined amplitude.

7. An audio frequency signal compressing system comprising:

amplifying means for amplifying an input signal to provide a power output signal having a power output signal amplitude and a feedback signal having a feedback signal amplitude, wherein the amplifying means comprise an amplifier and gain control means, connected to the amplifier, for controlling amplifier gain; and gain modification means, connected to the gain control means, for modifying the amplifier gain as a function of feedback signal amplitude, wherein the gain modification means comprise first and second feedback means for controlling gain modification, wherein the first feedback means include a peak detector connected to the feedback signal, a comparator connected to a peak detector output and used to compare the peak detector output to a first reference level and a first gain switch connected to the gain control means and which operates under control of the comparator to modify amplifier gain and wherein the second feedback means include a filter connected to the feedback signal and used to filter the feedback signal, averaging means for averaging the filtered feedback signal, comparison means for comparing the averaged filtered feedback signal to second and third reference levels to determine a desired amplifier gain and a second gain switch connected to the gain control means and the comparison means and which operates under control of the comparison means to set the desired amplifier gain.

8. The system according to claim 7 wherein the gain control means comprise a gain controller circuit, a plurality of resistors and means, connected to the first and second gain switches, for coupling one of the plurality of resistors to the gain control circuit.

9. The system according to claim 8 wherein the averaging means comprise means for selecting a time period over which the filtered feedback signal is averaged.

10. The system according to claim 9 wherein the comparator comprise means for generating an attack time delay and a decay time delay.

11. The system according to claim 10, wherein the amplifying means further comprise filter means for band limiting the feedback signal.

12. The system according to claim 11 wherein the system further comprises a headset connected to the power output signal and wherein the headset comprises hard-clipping circuit means for clipping the power output signal amplitude when it rises above a predetermined amplitude.

13. An audio frequency signal compressing system comprising:

amplifying means for amplifying an input signal to provide a power output signal having a power output signal amplitude and a feedback signal having a feedback signal amplitude, wherein the amplifying means comprise an amplifier and gain control means, connected to the amplifier, for controlling amplifier gain and wherein the gain control means comprise switching means for selecting one of a plurality of levels of gain; and gain modification means, connected to the gain control switching means, for selecting a gain level from the plurality of gain levels as a function of feedback signal amplitude, wherein the gain modification means comprise:

continuous high-level protection means for selecting one of the plurality of levels of gain as a function of feedback signal amplitude averaged over a predetermined time period; and automatic gain control means for selecting one of the plurality of levels of gain when the feedback signal amplitude exceeds a reference level.

14. The audio frequency signal compressing system according to claim 13 wherein the plurality of levels of gain comprise a first gain and a reduced gain and wherein the automatic gain control means comprise means for delaying selection of the reduced gain until the feedback signal amplitude has been above the reference level for a first predetermined time period.

15. The audio frequency signal compressing system according to claim 14 wherein the automated gain control means further comprise means for delaying, after selection of the reduced gain, selection of the first gain until the feedback signal amplitude has been below the reference level for a second predetermined time period.

16. The audio frequency signal compressing system according to claim 13 wherein the plurality of levels of gain comprise a first gain, an increased gain and a reduced gain and wherein the continuous high-level protection means comprise means for selecting the reduced gain when the average feedback signal amplitude passes above a second reference level and for selecting the increased gain when the average feedback signal amplitude passes below a third reference level.

* * * * *

UNITED STATES PATENT AND TRADEMARK OFFICE
CERTIFICATE OF CORRECTION

PATENT NO. : 5,303,308

DATED : April 12, 1994

INVENTOR(S) : Leo Larsen, et. al.

It is certified that error appears in the above-indentified patent and that said Letters Patent is hereby corrected as shown below:

Column 1, line 50, delete "micropascals" and insert --microPascals--.
Column 2, line 12, delete "regarded" and insert --required--.
Column 2, line 33, delete "sat" and insert --set--.
Column 2, line 34, delete "An" and insert --As--.
Column 2, line 37, delete "roast" and insert --reset--.
Column 3, line 1, delete "at" and insert --of--.
Colulmn 4, line 38, delete "hard-slipping" and insert --hard-clipping--.
Column 4, line 63, delete "it" after the word "correctly".
Column 5,line 3, delete "OSMA" and insert --OSHA--.
Column 5, line 12, delete "bed" and insert --bad--.
Column 5, line 21, delete "sat" and insert --set--.
Column 5, line 34, delete "band-pace" and insert --band-pass--.
Column 5, line 47, delete "," and insert --.--.
Column 5, line 48, delete "(a)" and insert --(s)--.
Column 5, line 49, delete "(Bound" and insert --(sound--.
Column 5, line 58, delete "in vie" and insert --is via--
Column 6, line 41, delete "filer" and insert --filter--.

UNITED STATES PATENT AND TRADEMARK OFFICE
CERTIFICATE OF CORRECTION

PATENT NO. : 5,303,308

DATED : April 12, 1994

INVENTOR(S) : Leo Larsen, e t. al.

It is certified that error appears in the above-indentified patent and that said Letters Patent is hereby corrected as shown below:

Column 8, line 44, delete "automated" and insert --automatic--.

Signed and Sealed this

Twenty-third Day of August, 1994

Attest:

BRUCE LEHMAN

Attesting Officer

Commissioner of Patents and Trademarks